US012051337B2

(12) United States Patent
Mathew et al.

(10) Patent No.: US 12,051,337 B2
(45) Date of Patent: Jul. 30, 2024

(54) SYSTEMS AND METHODS FOR LOW VISIBILITY GUIDANCE AND TAXI ROUTING

(71) Applicant: HONEYWELL INTERNATIONAL INC., Charlotte, NC (US)

(72) Inventors: Bincicil Mathew, Bangalore (IN); Gang He, Morris Plains, NJ (US); Pavan Kumar Desai, Bangalore (IN); Rakshit R, Bangalore (IN); Roshini Mehboob, Bangalore (IN); Thea Feyereisen, Minneapolis, MN (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 735 days.

(21) Appl. No.: 17/220,334

(22) Filed: Apr. 1, 2021

(65) Prior Publication Data

US 2022/0262266 A1 Aug. 18, 2022

(30) Foreign Application Priority Data

Feb. 17, 2021 (IN) ............................ 202111006630

(51) Int. Cl.
*G08G 5/06* (2006.01)
*G08G 5/00* (2006.01)

(52) U.S. Cl.
CPC ........... *G08G 5/065* (2013.01); *G08G 5/0021* (2013.01); *G08G 5/003* (2013.01); *G08G 5/0091* (2013.01)

(58) Field of Classification Search
CPC ...... G08G 5/065; G08G 5/0021; G08G 5/003; G08G 5/0091
See application file for complete search history.

(56) References Cited

U.S. PATENT DOCUMENTS

| | | | | |
|---|---|---|---|---|
| 10,495,465 | B2 | 12/2019 | Jeong et al. | |
| 2018/0061243 | A1 | 3/2018 | Shloosh | |
| 2019/0043164 | A1* | 2/2019 | He | G01C 23/005 |
| 2020/0168109 | A1 | 5/2020 | Gartner et al. | |
| 2020/0202726 | A1 | 6/2020 | Kestenbach et al. | |

FOREIGN PATENT DOCUMENTS

| | | | |
|---|---|---|---|
| CN | 109754643 | A | 5/2019 |
| JP | 2002245600 | A | 8/2002 |

* cited by examiner

*Primary Examiner* — Shon G Foley
(74) *Attorney, Agent, or Firm* — Lorenz & Kopf LLP

(57) ABSTRACT

Methods and systems for low visibility surface movement guidance for an aircraft navigating an airport environment. The system includes an avionic display module on an aircraft, configured to receive ownship data and generate an avionic display on a display device, and to respond to display commands. The system also includes a low voltage (LV) conditions module, configured to: receive weather data and determine when low voltage LV conditions are occurring; and, responsive to determining that LV conditions are occurring, (i) generate display commands to reconfigure the avionic display to present the LVO plan, rendered in accordance with a preprogrammed visualization scheme for rendering LV features in the LVO plan, and (ii) calculate an optimized taxi route for the aircraft to a target airport point of interest, as a function of the LVO plan. The system generates display commands to render the optimized taxi route on the reconfigured avionic display.

17 Claims, 9 Drawing Sheets

600

SYSTEMS AND METHODS FOR LOW VISIBILITY GUIDANCE AND TAXI ROUTING

CROSS REFERENCE TO RELATED APPLICATION

This application claims priority to Indian Provisional Patent Application No. 202111006630, filed Feb. 17, 2021, the entire content of which is incorporated by reference herein.

TECHNICAL FIELD

The following disclosure relates generally to systems and methods that provide aircraft guidance, and, more particularly, to systems and methods that provide low visibility surface movement guidance and taxi routing for an aircraft.

BACKGROUND

Many pilots report that low visibility operations are the most technically challenging. Low visibility operations are those that occur when the runway visible range (RVR) is below 1200 feet (360 m). Airports authorized for takeoff and/or landing or surface operations below RVR 1200 generally have a complete low visibility operation (LVO) surface movement guidance control system (SMGCS) plan (shortened herein to LVO plan) defined which covers planned low visibility operations and adequate visual cues. These LVO plans include low visibility taxi routes (LVTR).

Although pilots often rely on instrument navigation (INAV) systems during low visibility scenarios, a technical problem is presented in that the Low Visibility Taxi Routes (LVTR) are not generally displayed by typical navigational display systems due to an unavailability of data and/or display clutter issues systems. Instead, in a low visibility scenario, a pilot may have to reference an LVO plan in the form of a static digital chart, presented on a separate display screen. It can be technically challenging for the pilot to look for the relevant low visibility taxi route on the separately displayed chart that is not cross linked to his moving map display, and, further, to orient himself with respect to his current position on that separately displayed chart. In other scenarios, when LVO route data and other airport taxi guidance data and objects data are presented, constantly, on a navigational display, the navigation display can be too cluttered and this can be technically challenging for the pilot to understand low visibility routes and operation constraints conditions. These low visibility scenarios can result in runway and/or taxiway incursions if not safely addressed.

Accordingly, technologically improved aircraft guidance systems and methods that provide low visibility surface movement guidance and taxi routing are desirable. Furthermore, other desirable features and characteristics of the present invention will be apparent from the subsequent detailed description and the appended claims, taken in conjunction with the accompanying drawings and the foregoing technical field and background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

Provided is a system for low visibility surface movement guidance for an aircraft navigating an airport environment. The system includes: a source of aircraft status data; a display device configured to render an avionic display showing a location and trajectory of the aircraft; a source of a low visibility operation (LVO) plan, the LVO plan providing an available low visibility taxi route (LVTR) options for a taxi operation target at the airport; a source configured to provide an enable for a low-visibility setting; a source of a visualization scheme, the visualization scheme being a scheme for rendering low visibility (LV) features in the LVO plan; a source of weather data; and a controller circuit operationally coupled to the source of aircraft status data, the display device, the source of the LVO plan, the source configured to provide an enable for a low-visibility setting, the source of the visualization scheme, and the source of weather data, the controller circuit configured to: receive the enable for the low-visibility setting; determine that low visibility (LV) conditions are occurring, responsive to the enable for the low-visibility setting; reconfigure the avionic display to present the LVO plan, in accordance with the visualization scheme, responsive to determining that LV conditions are occurring; calculate an optimized taxi route for the aircraft to a target airport point of interest, as a function of the LVO plan, responsive to determining that LV conditions are occurring; and render the optimized taxi route on the reconfigured avionic display.

A processor-implemented method for providing low visibility surface movement guidance for an aircraft navigating an airport environment is provided. The method includes: rendering, on a display device, an avionic display showing a location and trajectory of the aircraft, using received aircraft status data; receiving weather data; determining that low visibility conditions are occurring; referencing a plan providing an available low visibility taxi route (LVTR) option for a target runway at the airport, or a preferred taxi route (PTR), responsive to determining that low visibility (LV) conditions are occurring; reconfiguring the avionic display to present the LVO plan or a PTR plan, rendered in accordance with a preprogrammed visualization scheme for rendering LV features, responsive to determining that LV conditions are occurring; calculating an optimized taxi route for the aircraft to a target airport point of interest, as a function of the LVO plan or PTR plan, responsive to determining that LV conditions are occurring; and rendering the optimized taxi route on the reconfigured avionic display.

Also provided is a system for low visibility surface movement guidance for an aircraft navigating an airport environment. The system includes an avionic display module on an aircraft, configured by programming instructions to receive ownship data and generate an avionic display on a display device; and respond to display commands; and a low voltage (LV) conditions module, configured by programming instructions to: determine when low voltage LV conditions are occurring; generate display commands to reconfigure the avionic display to present the LVO plan, rendered in accordance with a preprogrammed visualization scheme for rendering LV features in the LVO plan, responsive to determining that LV conditions are occurring; calculate an optimized taxi route for the aircraft to a target airport point of interest, as a function of the LVO plan, responsive to determining that LV conditions are occurring; and generate display commands to render the optimized taxi route on the reconfigured avionic display.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

At least one example of the present invention will hereinafter be described in conjunction with the following figures, wherein like numerals denote like elements, and.

DETAILED DESCRIPTION

Figure 1:
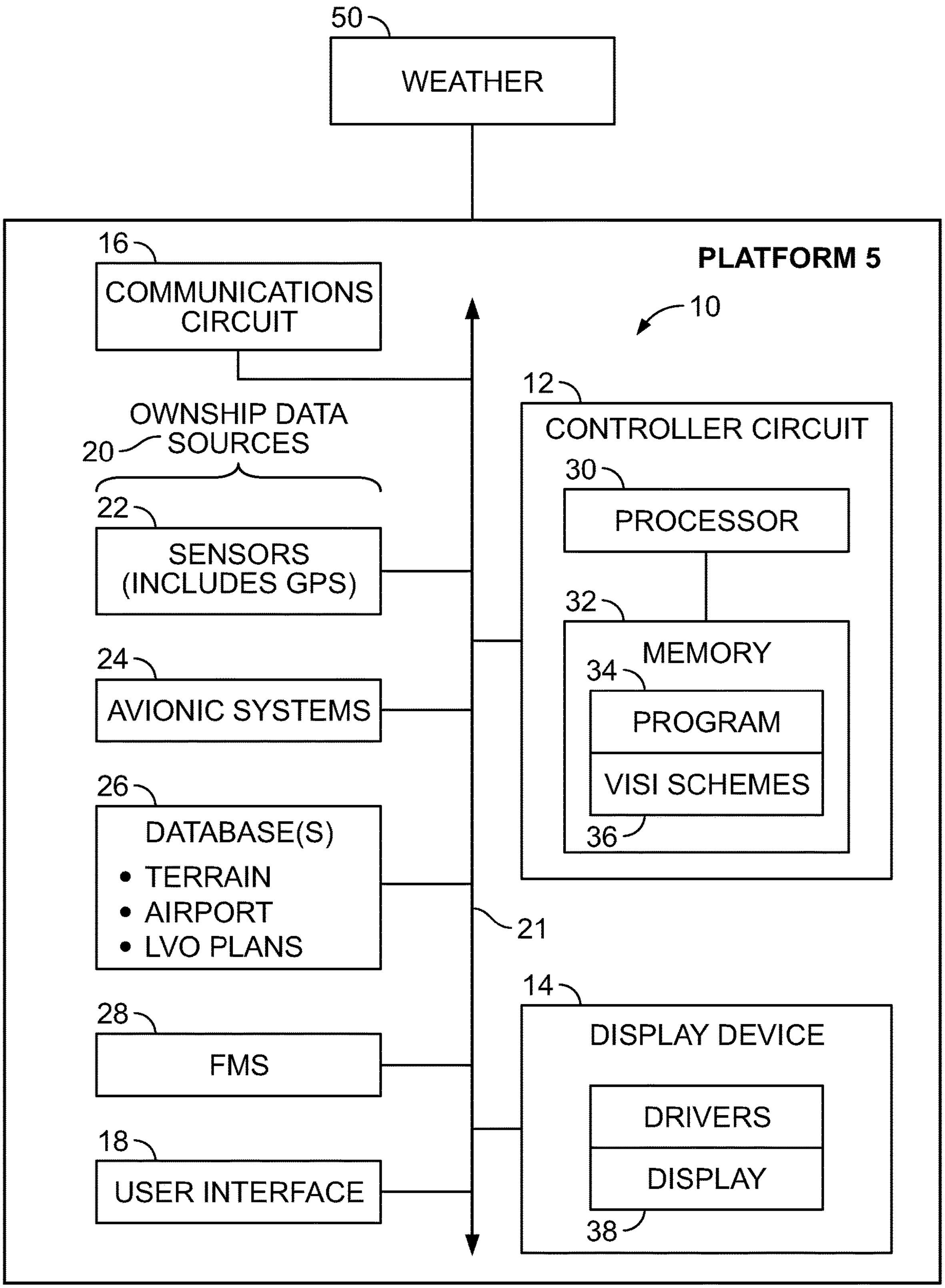
FIG. 1 is a block diagram of a system providing low visibility guidance and taxi routing for an aircraft, as illustrated in accordance with an exemplary embodiment of the present disclosure.

The following Detailed Description is merely exemplary in nature and is not intended to limit the invention or the application and uses of the invention. The term "exemplary," as appearing throughout this document, is synonymous with the term "example" and is utilized repeatedly below to emphasize that the description appearing in the following section merely provides multiple non-limiting examples of the invention and should not be construed to restrict the scope of the invention, as set-out in the Claims, in any respect. As further appearing herein, the term "pilot" encompasses all users of the below-described aircraft system.

As mentioned, Low visibility operations are those that occur when the runway visual range (RVR) is below 1200 feet (360 m). Airports authorized for takeoff and/or landing or surface operations below RVR 1200 generally have a complete low visibility operation (LVO)SMGCS plan defined which covers planned low visibility operations and adequate visual cues. This LVO/SMGCS plan contains, for an airport, each low visibility operation and Low Visibility Taxi Route (LVTR), described in detail, along with any supporting facilities and aircraft equipment requirements.

Although pilots often rely on instrument navigation (INAV) systems during low visibility scenarios, Low Visibility Taxi Routes (LVTR) are not generally displayed by INAV systems. Instead, pilots conducting low visibility operations at an airport authorized for low visibility operations are required to have a copy of the LVO/SMGCS plan, generally provided as a static digital chart, via an appropriate National Ocean Service (NOS) and Jeppesen chart. In a low visibility scenario, a pilot may have to reference the LVO plan in the digital chart, generally, by displaying it on a separate display screen that is not cross linked to the airport moving map image. It technically challenging for the pilot to look for the relevant taxi route on the separately displayed chart and, further, to orient himself with respect to finding his (dynamically changing) current position on the separately displayed chart.

As a result, during low visibility scenarios, and at the busier and more complex airports, pilots may taxi with more caution, at slower speeds, and sometimes with a less-than-ideal awareness of where they are on the airport surface. Additionally, low visibility scenarios often result in delays in taxiing because a pilot may be reliant on ground control having to tell him every turn and where he is at a given point in time.

Accordingly, low visibility operations provide several technical problems, and improved aircraft guidance systems and methods that provide low visibility guidance and taxi routing are desirable. The present disclosure provides a solution to the above problems in the form of systems and methods for low visibility guidance and taxi routing. The present disclosure can provide low visibility guidance and taxi routing on an airport moving map, and can cross link the low visibility guidance display to the appropriate LVO plan chart.

FIG. 1 is a block diagram of a system 10 for low visibility guidance and taxi routing, as illustrated in accordance with an exemplary and non-limiting embodiment of the present disclosure. The system 10 for low visibility guidance and taxi routing may be utilized onboard a mobile platform 5 to provide enhanced low visibility guidance, as described herein. In various embodiments, the mobile platform is an aircraft 5, which carries or is equipped with the system 10 for an instrument landing system (ILS) landing operation. As schematically depicted in FIG. 1, system 10 for an instrument landing system (ILS) alerting for an aircraft (shortened herein to "system" 10) includes the following components or subsystems, each of which may assume the form of a single device or multiple interconnected devices: a controller circuit 12 operationally coupled to: at least one display device 14; a communications circuit 16; a user interface 18, and one or more ownship data sources 20. In various embodiments, the controller circuit 12 communicates with the other components of the system 10 via a communication bus 21.

The display device 14 can include any number and type of image generating devices on which one or more avionic displays 36 may be produced. The display device 14 may embody a touch screen display. When the system 10 is utilized for a manned Aircraft, display device 14 may be affixed to the static structure of the Aircraft cockpit as, for example, a Head Down Display (HDD) or Head Up Display (HUD) unit. Alternatively, display device 14 may assume the form of a movable display device (e.g., a pilot-worn display device) or a portable display device, such as an Electronic Flight Bag (EFB), a laptop, or a tablet computer carried into the Aircraft cockpit by a pilot.

The communications circuit 16 generally includes an antenna, which may wirelessly transmit data to and receive real-time data and signals from various external sources, including, each of: weather service source 50, traffic, air traffic control (ATC), ILS antennas (glide slope and localizer), ground stations, and the like.

The user interface 18 may include any combination of a keyboard, cursor control device, voice input device, gesture input apparatus, or the like.

The ownship data sources 20 generally include an array of flight parameter and geographic positioning system (GPS) sensors 22, onboard avionic systems 24, and a database 26. The ownship data sources may include a flight management system (FMS) 28. The ownship data sources 20 are further described below.

Flight parameter and GPS sensors 22 supply various types of data or measurements to controller circuit 12 during Aircraft flight. In various embodiments, the sensors 22 supply, without limitation, one or more of: inertial reference system measurements providing a location, Flight Path Angle (FPA) measurements, airspeed data, groundspeed data (including groundspeed direction), vertical speed data, vertical acceleration data, altitude data, attitude data including pitch data and roll measurements, yaw data, heading information, sensed atmospheric conditions data (including wind speed and direction data), flight path data, flight track data, radar altitude data, and geometric altitude data.

Onboard avionic systems 24 provide feedback and control for the engine and flight configuration equipment.

The database 26 may, in practice, be realized as one or more different onboard databases, each being a computer-readable storage media or memory. In various embodiments, two- or three-dimensional map data may be stored in a database 26, including airport features data, geographical (terrain), buildings, bridges, and other structures, street maps, and navigational databases, which may be updated on a periodic or iterative basis to ensure data timeliness. With respect to the present system 10, the database 26 stores and is a source for at least one low visibility operation (LVO) plan, each LVO plan being specific to an airport, each LVO plan providing an available low visibility taxi route (LVTR) option to get to a target airport point of interest at the airport. In an example the target airport point of interest at the airport is a target runway. This map data and LVO plan data may be uploaded into the database 26 at an initialization step and then periodically updated, as directed by either a program 34 update or by an externally triggered update.

Although schematically illustrated in FIG. 1 as a single unit, the individual elements and components of the system 10 can be implemented in a distributed manner utilizing any practical number of physically distinct and operatively interconnected pieces of hardware or equipment. When the system 10 is utilized as described herein, the various components of the system 10 will typically all be located onboard the Aircraft 5. In various embodiments, the system 10 may be separate from or integrated within: a flight management system (FMS) and/or a flight control system (FCS).

The term "controller circuit," as appearing herein, broadly encompasses those components utilized to carry-out or otherwise support the processing functionalities of the system 10. Accordingly, controller circuit 12 can be implemented as a programmable logic array, application specific integrated circuit, system on a chip (SOC), or other similar firmware, as well as by a combination of any number of individual processors, flight control computers, navigational equipment pieces, computer-readable storage devices (including or in addition to memory 32), power supplies, storage devices, interface cards, and other standardized components.

In various embodiments, controller circuit 12 embodies an enhanced computer processer, having one or more processors 30 operationally coupled to computer-readable storage media or memory 32, having stored therein at least one novel firmware or software program 34 (generally, computer-readable instructions that embody an algorithm) for carrying-out the various process tasks, calculations, and control/display functions described herein. During operation, the controller circuit 12 may be programmed with and execute the at least one firmware or software program, for example, program 34, that embodies an algorithm for receiving, processing, and displaying, LVO guidance for an aircraft 5, to thereby perform the various process steps, tasks, calculations, and control/display functions described herein.

Controller circuit 12 may exchange data, including real-time wireless data, with one or more external sources, such as the weather service source 50 to support operation of the system 10 in embodiments. In this case, the controller circuit 12 may utilize the communications circuit 16 to manage bidirectional wireless data exchange over a communications network, such as a public or private network implemented in accordance with Transmission Control Protocol/Internet Protocol architectures or other conventional protocol standards. Encryption and mutual authentication techniques may be applied, as appropriate, to ensure data security. In various embodiments, the communications circuit 16 is integrated within the controller circuit 12.

Memory 32 is a data storage that can encompass any number and type of storage media suitable for storing computer-readable code or instructions, such as the aforementioned software program 34, as well as other data generally supporting the operation of the system 10. Memory 32 may also store and be the source of one or more preprogrammed visualization schemes 36, for use by the algorithm embodied in software program 34. Each visualization scheme 36 includes a set of rules for using visually distinguishing techniques, such as using a highlight color, a highlight box, or a bright color that is not otherwise used by elements in the AMM to show the LVTR or a preferred taxi route (PTR). A PTR may be a user selected taxi route for use during LVO, from among a plurality of LVTR, or it may be separately input by a user. In cases in which black and white displays are relied upon, the visually distinguishing techniques may include changing line thicknesses and/or using dashed/dotted lines. Additionally, one or more visualization schemes may employ a series of sequential arrows to indicate directionality for a relevant LVTR or PTR.

In certain embodiments of system 10, the controller circuit 12 and the other components of the system 10 may be integrated within or cooperate with any number and type of systems commonly deployed onboard an aircraft including, for example, an FMS, an Attitude Heading Reference System (AHRS), an Instrument Landing System (ILS), and/or an Inertial Reference System (IRS).

With continued reference to FIG. 1, the display device 14 includes the necessary display drivers to generate at least one avionic display 38 during operation of the system 10; the term "avionic display" defined as synonymous with the term "aircraft-related display" and "cockpit display" and encompasses displays generated in textual, graphical, cartographical, and other formats. In various embodiments, the avionic display 38 is a primary flight display (PFD) or a navigation display. In various embodiments, the avionic display 38 can be, or include, any of various types of lateral displays and vertical situation displays on which map views and symbology, text annunciations, and other graphics pertaining to flight planning are presented for a pilot to view. The avionic display 38 generated and controlled by the system 10 can include graphical user interface (GUI) objects and alphanumerical input displays of the type commonly presented on the screens of MCDUs, as well as Control Display Units (CDUs) generally. Specifically, embodiments of avionic displays 38 include one or more two dimensional (2D) avionic displays, such as a horizontal (i.e., lateral) navigation display or vertical navigation display; and/or on one or more three dimensional (3D) avionic displays, such as a Primary Flight Display (PFD) or an exocentric 3D avionic display. The display device 14 is configured to continuously render at least a lateral display 38 showing the aircraft 5 at its current location and trajectory within the relevant map data, e.g., an airport moving map (AMM).

In various embodiments, a human-machine interface, such as the above described touch screen display, is implemented as an integration of the user interface 18 and a display device 14. Via various display and graphics systems processes, the controller circuit 12 may command and control the touch screen display generating a variety of graphical user interface (GUI) objects or elements described herein, including, for example, buttons, sliders, and the like, which are used to prompt a user to interact with the human-machine interface to provide user input, and to activate respective functions and provide user feedback, responsive to received user input at the GUI element.

Figure 2:
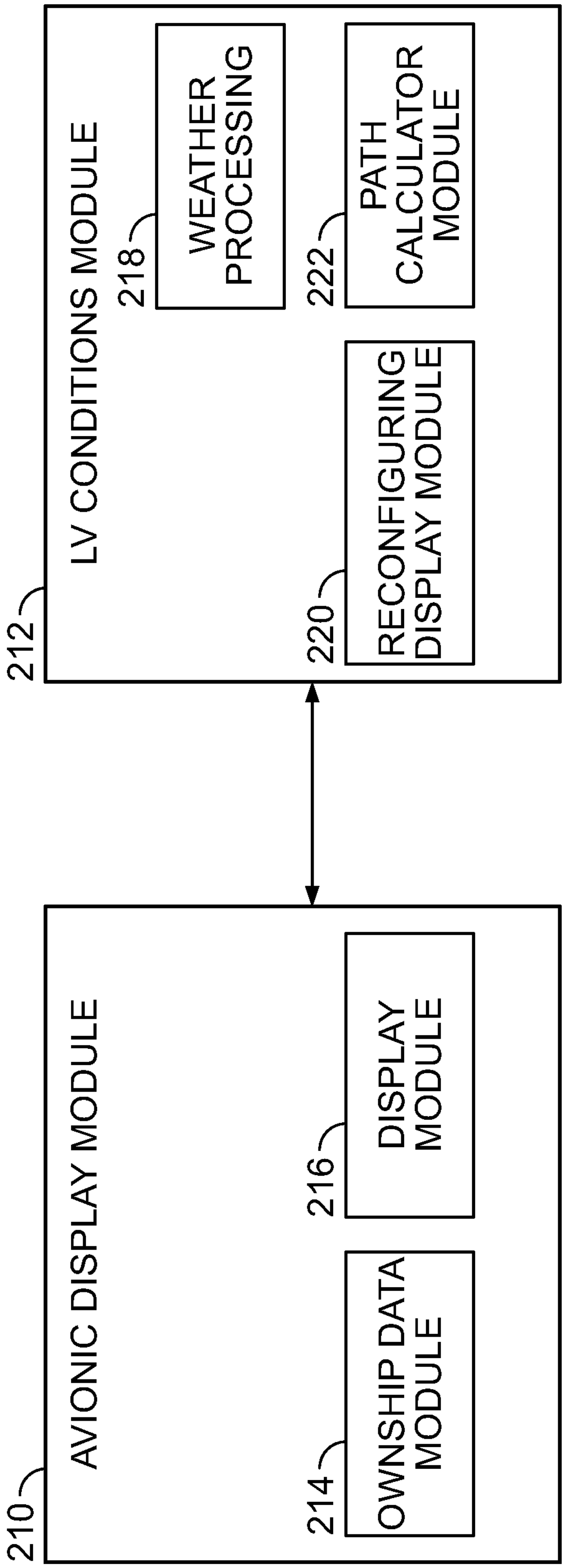
FIG. 2 is an architectural block diagram of one or more application modules that may be operating in the system shown in FIG. 1, in accordance with an exemplary embodiment of the present disclosure.
Figure 3:
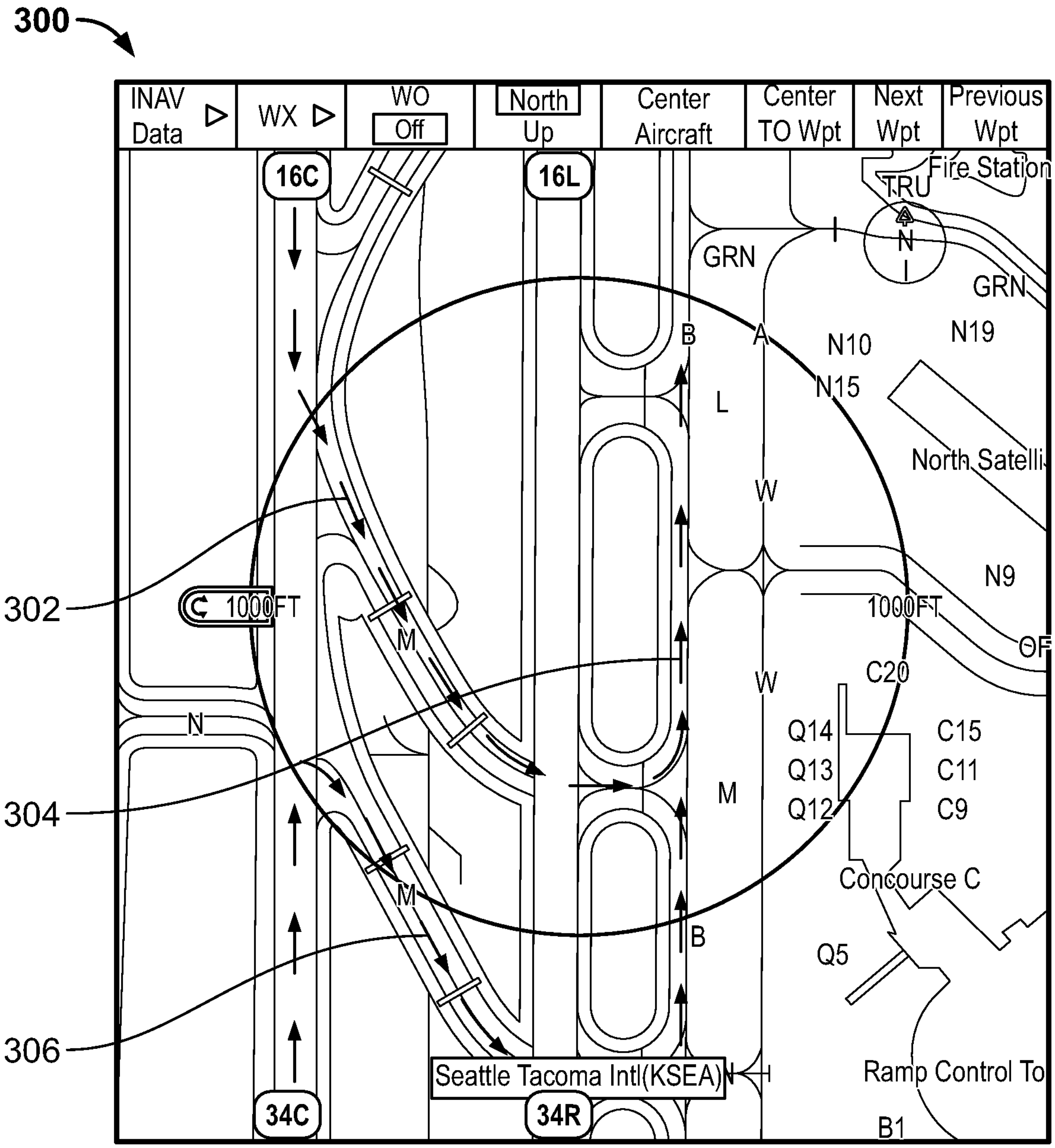
FIGS. 3-8 depict various avionic display examples that the system of FIG. 1 may generate, in accordance with an exemplary embodiment of the present disclosure.

FIG. 2 provides an architectural block diagram of one or more application modules that may be operating in the system 10. In various embodiments, the applications modules may be embodied as blocks of hardware or software programming instructions, such as program 34. In various embodiments, the system 10 may include an avionic display module 210 and a low voltage (LV) conditions module 212, that are configured to process the display of an avionic display 38 and determination that low visibility (LV) conditions are occurring, as a function of the weather data; process the reconfiguration of the avionic display to present the LVO plan for the airport (in accordance with the visualization scheme for rendering low visibility (LV) features in the LVO plan), responsive to determining that LV conditions are occurring; calculate an optimized taxi route for the aircraft to a target airport point of interest, as a function of the LVO plan, responsive to determining that LV conditions are occurring; and render the optimized taxi route on the reconfigured avionic display. In other embodiments, one or more modules may operate on separate computing devices. For example, in various embodiments, the avionic display module 210 may be configured to operate on an aircraft 5, and the LV conditions module 212 may be configured to operate on a mobile device.

In various embodiments, the avionic display module 210 is configured with an ownship data module 214 for receiving or actively acquiring ownship data from the various ownship data sources 20. The avionic display module 210 may also have a display module 216 that is configured to drive the display device 14 to render the avionic display(s) 38, based at least in part on the data from the ownship data sources 20, such as aircraft status data. In various embodiments, the avionic display module 210 is configured to respond to commands from the LV conditions module 212 to present the reconfigured avionic display 38.

The LV conditions module 212 may receive input from a source configured to provide an enable for a low-visibility setting ("the enable source"). In some embodiments, the enable source is the weather processing module 218, which has processed the weather data received from the external weather service source 50 with various thresholds and decision algorithms (e.g., in program 34) and determined that low visibility conditions are occurring at a target airport point of interest. In a non-limiting example, the weather processing module 218 may determine that low visibility (LV) conditions are occurring by comparing an aspect of the weather data (e.g., a visibility distance) to a preprogrammed runway visibility threshold (e.g., also a distance). In some embodiments, the enable source is a user input, such as, when a pilot hears a RVR setting and presses a button on a user interface. Additionally, the enable source may be a speaker providing speech input, such could be provided by an ATIS radio announcement.

Regardless of the enable source, responsive to receiving the enable for the low-visibility setting, the LV conditions module 212 determines that low visibility conditions are occurring and is configured with a reconfiguring display module 220 and a path calculator module 222, that each operate responsive to the determination that low visibility conditions are occurring. The reconfiguring display module 220 may, in response to the determination that low visibility conditions are occurring, reference the stored LVO plan providing an available low visibility taxi route (LVTR) option for the airport, and reference the preprogrammed visualization scheme, and, based thereon, reconfigure the avionic display 38 to present the LVO plan for the airport, in accordance with the visualization scheme. Specifically, "present the LVO plan for the airport, in accordance with the visualization scheme" means at least displaying an airport moving map (AMM) and visually distinguishing relevant LVTR information on the moving map from other elements presented on the moving map. As mentioned, the visually distinguishing techniques include using arrows and color distinctions to distinguish a LVTR from other elements displayed in the AMM. In various embodiments, the LV conditions module may reconfigure the avionic display 38 to present the LVO plan for the airport, in accordance with the visualization scheme responsive to a user request received via the user interface 18.

As may be appreciated, in embodiments in which the pilot wants to use a PTR, in response to the determination that low visibility conditions are occurring, the reconfiguring display module 220, may reference the PTR, and reference the preprogrammed visualization scheme, and, based thereon, reconfigure the avionic display 38 to present the PTR plan for the airport, in accordance with the visualization scheme.

In various embodiments, the LVO plan is one of a plurality of LVO plans for the airport that are stored in database 26. In various embodiments, the visualization scheme is one of a plurality of visualization schemes stored in memory 32.

In various embodiments, "reconfiguring the avionic display 38" includes generating display commands for the display device 14 and communicating them to the avionic display module 210.

Figure 7:
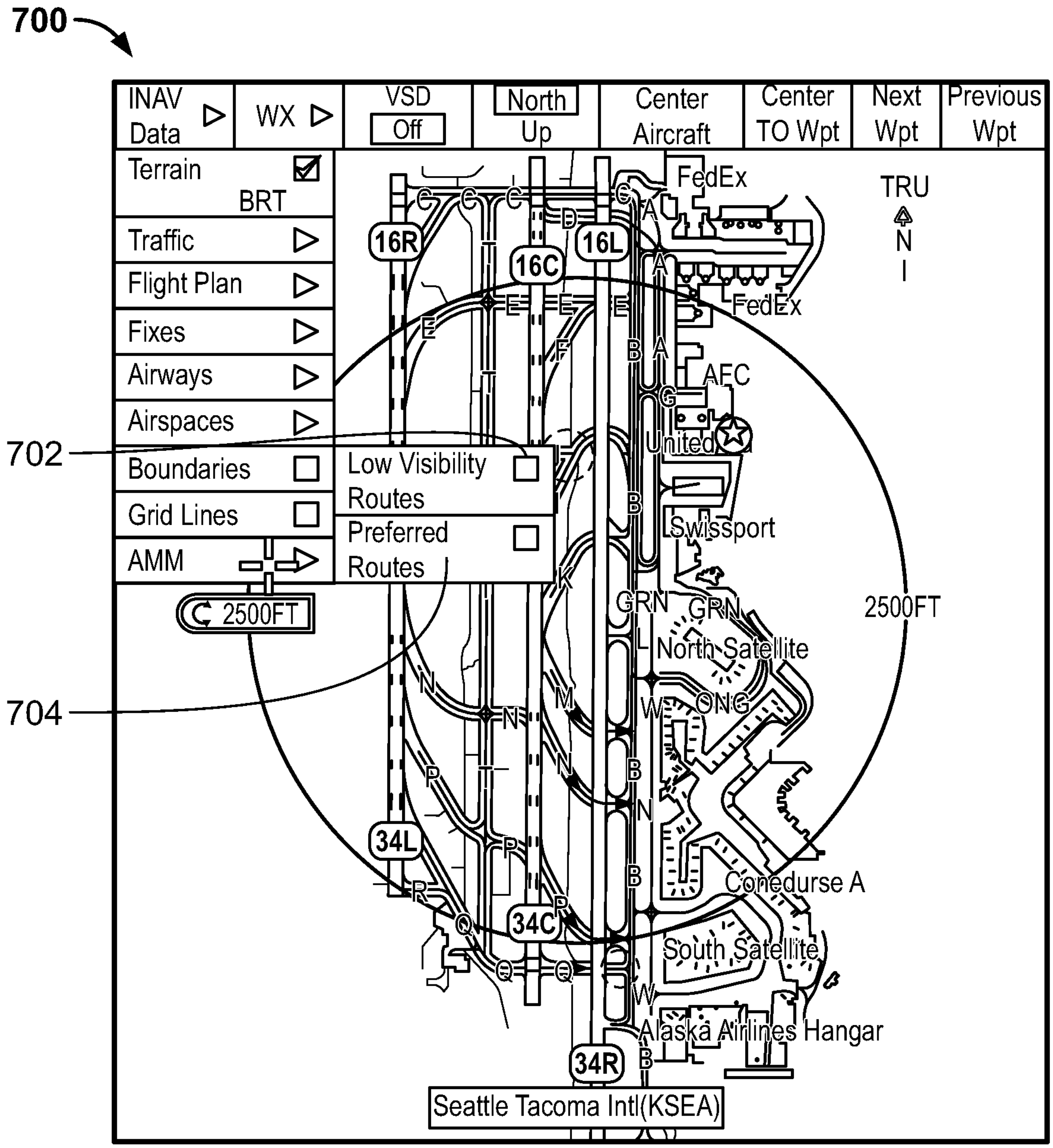
Figure 8:
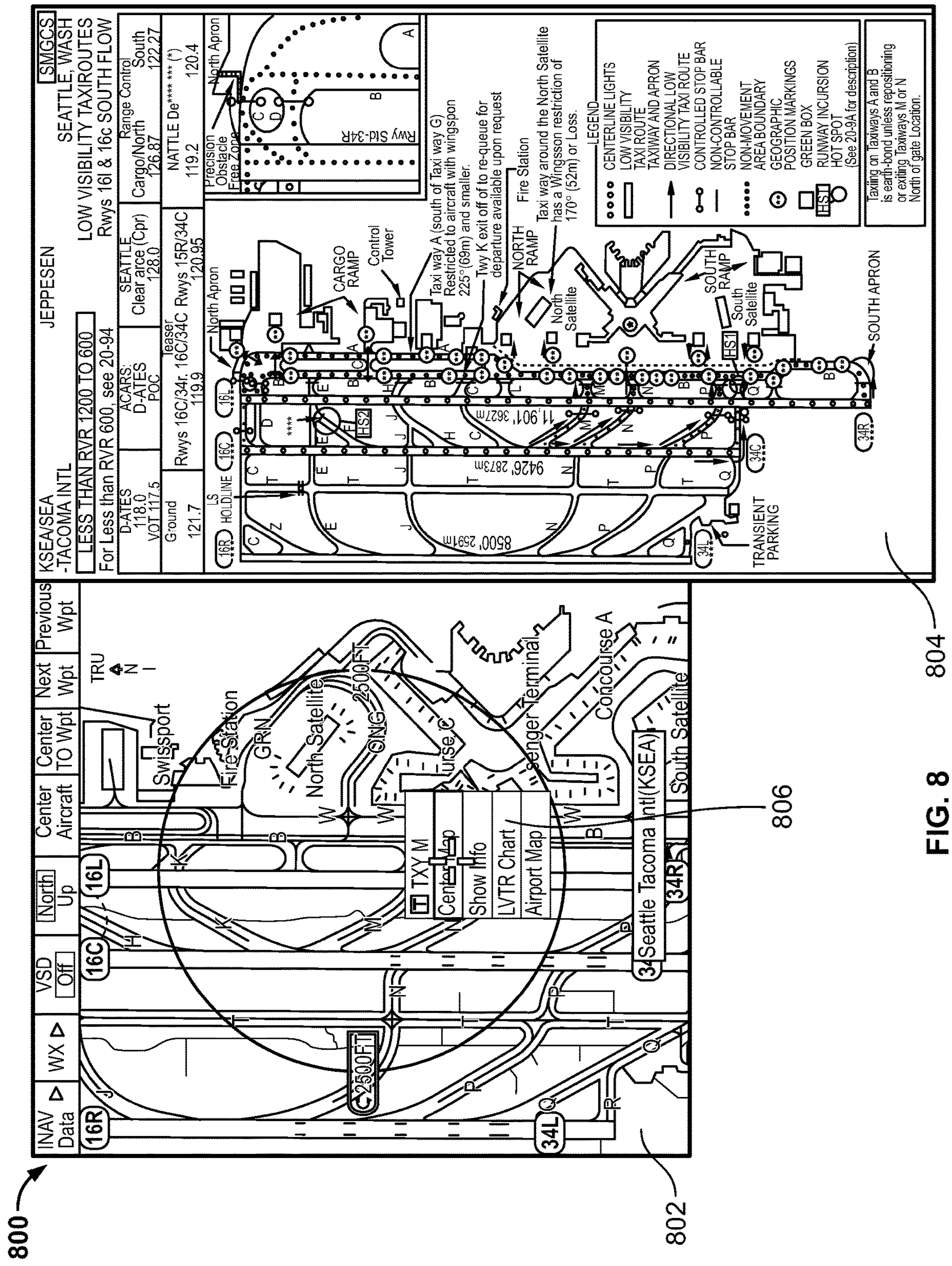

As mentioned, the system 10 may be configured to accept a user request to display the LVO plan chart, cross referenced to an existing lateral display view. Accordingly, in various embodiments, reconfiguring the avionic display 38 further includes generating display commands for the display device 14 to render the avionic display 38 having two areas: one area in which to render the LVO plan from the published chart, alongside a second area for the above described moving map. In embodiments in which the PTR is selected, reconfiguring the avionic display 38 further includes generating display commands for the display device 14 to render the avionic display 38 having two areas: one area in which to render aPTR plan from the published chart, alongside a second area for the above described moving map. The system 10 provides a cross-linkage between the AMM and the invoked chart (see FIG. 7).

The path calculator module 222 may be configured to identify a target airport point of interest, as a function of the LVO plan, and calculate an optimized taxi route for the aircraft to the target airport point of interest. In various embodiments, the path calculator module 222 may be configured to identify a target airport point of interest, as a function of the PTR plan, and calculate an optimized taxi route for the aircraft to the target airport point of interest. In various embodiments, the target airport point of interest is a target runway. In some embodiments, the target point of interest is provided by the FMS 28. In some embodiments, the target point of interest is provided by a user, via the user interface 18.

The path calculator module 222 may also be configured to render the optimized taxi route on the reconfigured avionic display 38. In various embodiments, rendering the optimized taxi route on the reconfigured avionic display 38 includes generating display commands for the display device 14, and communicating them to the avionic display module 210. In various embodiments, the path calculator module 222 may, responsive to determining that LV conditions are occurring, predict an optimized runway for the aircraft at the airport; and prompt a user to request the optimized runway when it is different than the target runway.

Figure 4:
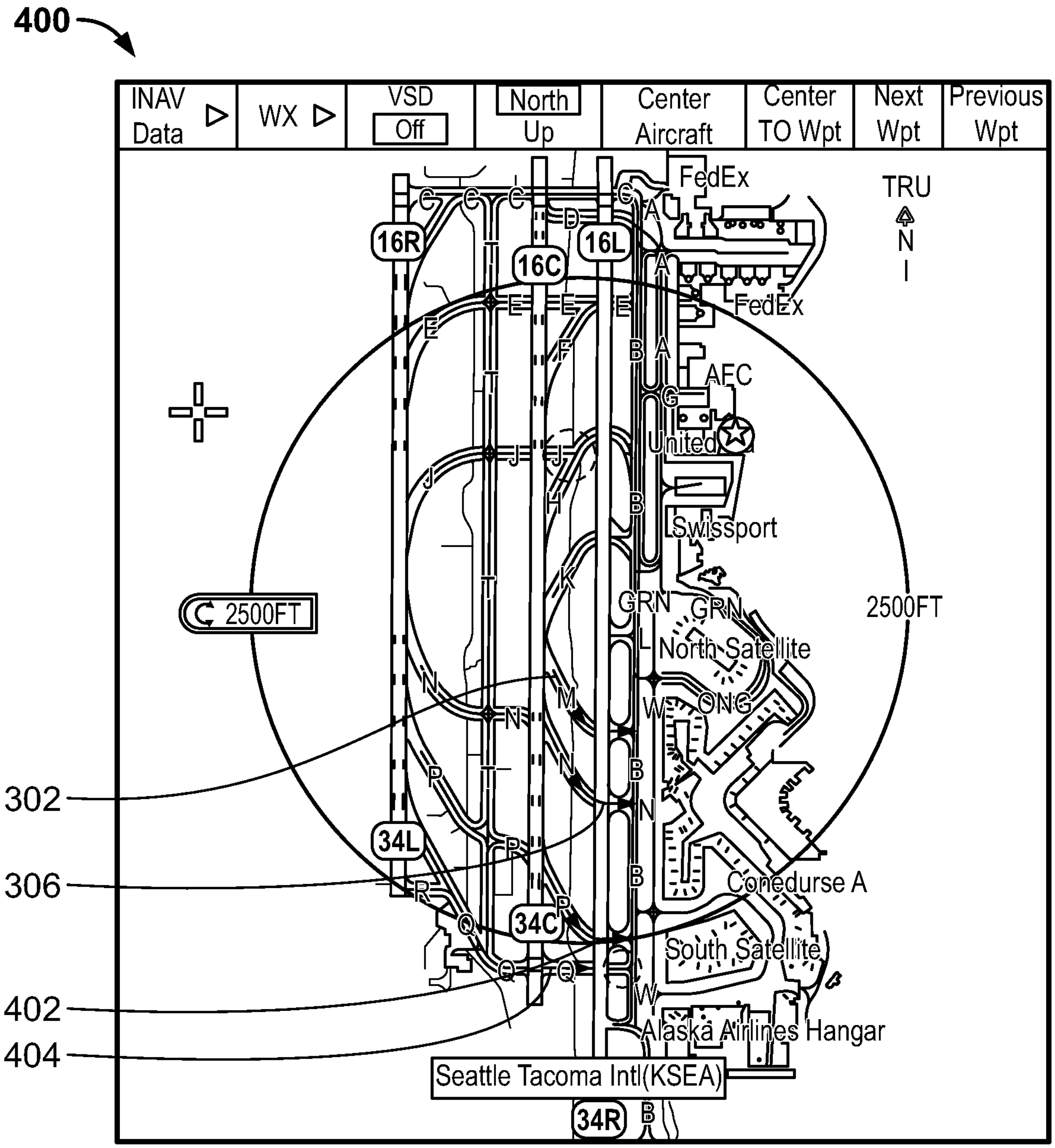
Figure 5:
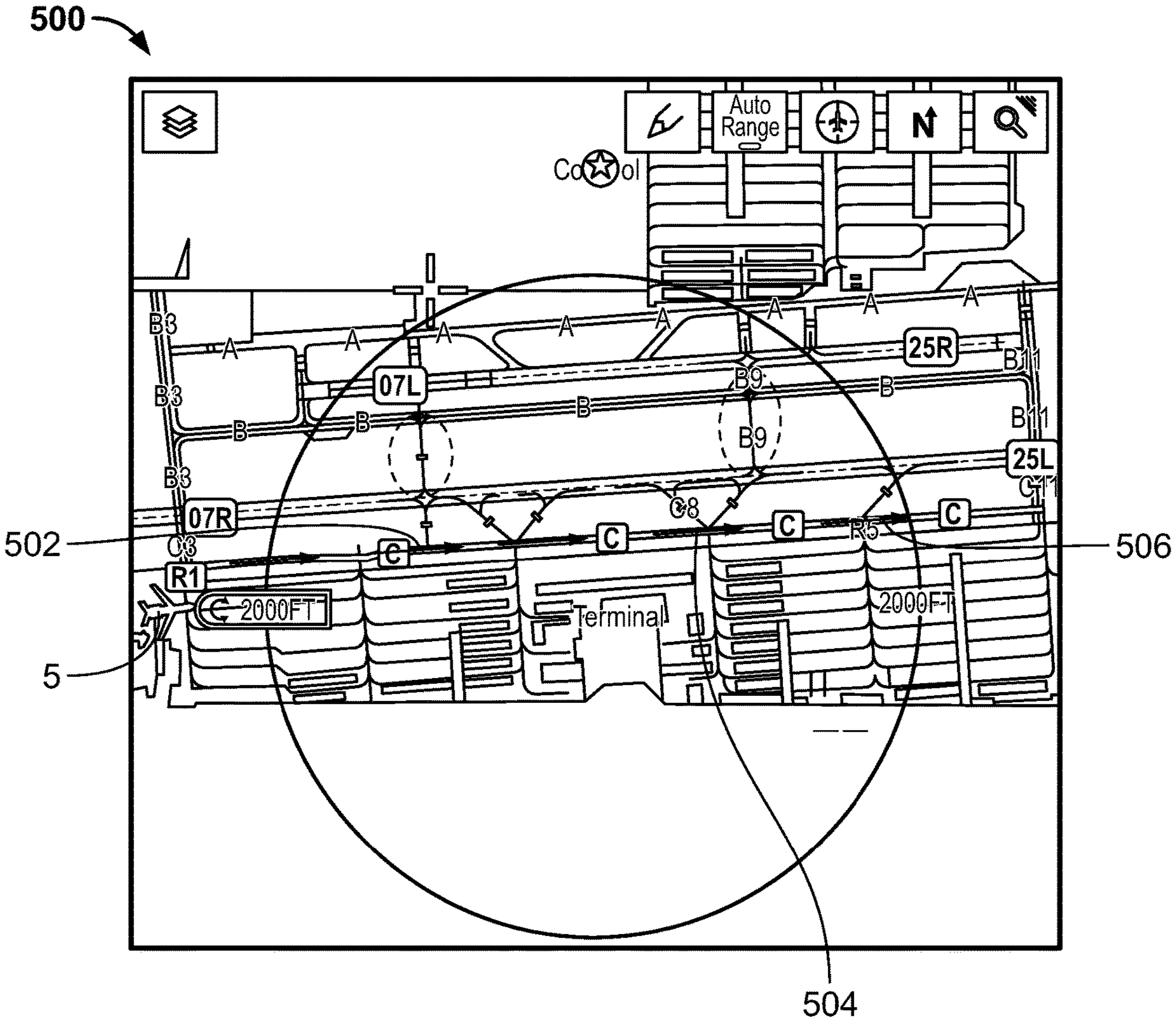

Turning now to FIGS. 3-8, various views of an avionic display 3 are provided. Each view presents an airport moving map (AMM) that has been reconfigured to depict the low visibility guidance and taxi routing provided by the system 10. AMM 300 depicts various LVTR at the Seattle-Tacoma Intl airport. Arrows 302, 304, and 306 are arranged to show exit paths from a runway 34C/16C, across a runway 34R/16L. In AMM 300, the range ring is set to 1000 ft. In FIG. 4, the range ring is set to 2500 ft, showing more of the airport surface. Accordingly, AMM 400 depicts additional paths using arrows 402 and 404. On AMM 500, the preferred taxi route (PTR) is indicated with arrows 502, 504, and 506. In various embodiments, the system 10 offers a declutter option, in which, responsive to a pilot input selecting it, the non-PTR taxi routes are de-emphasized.

Figure 6:
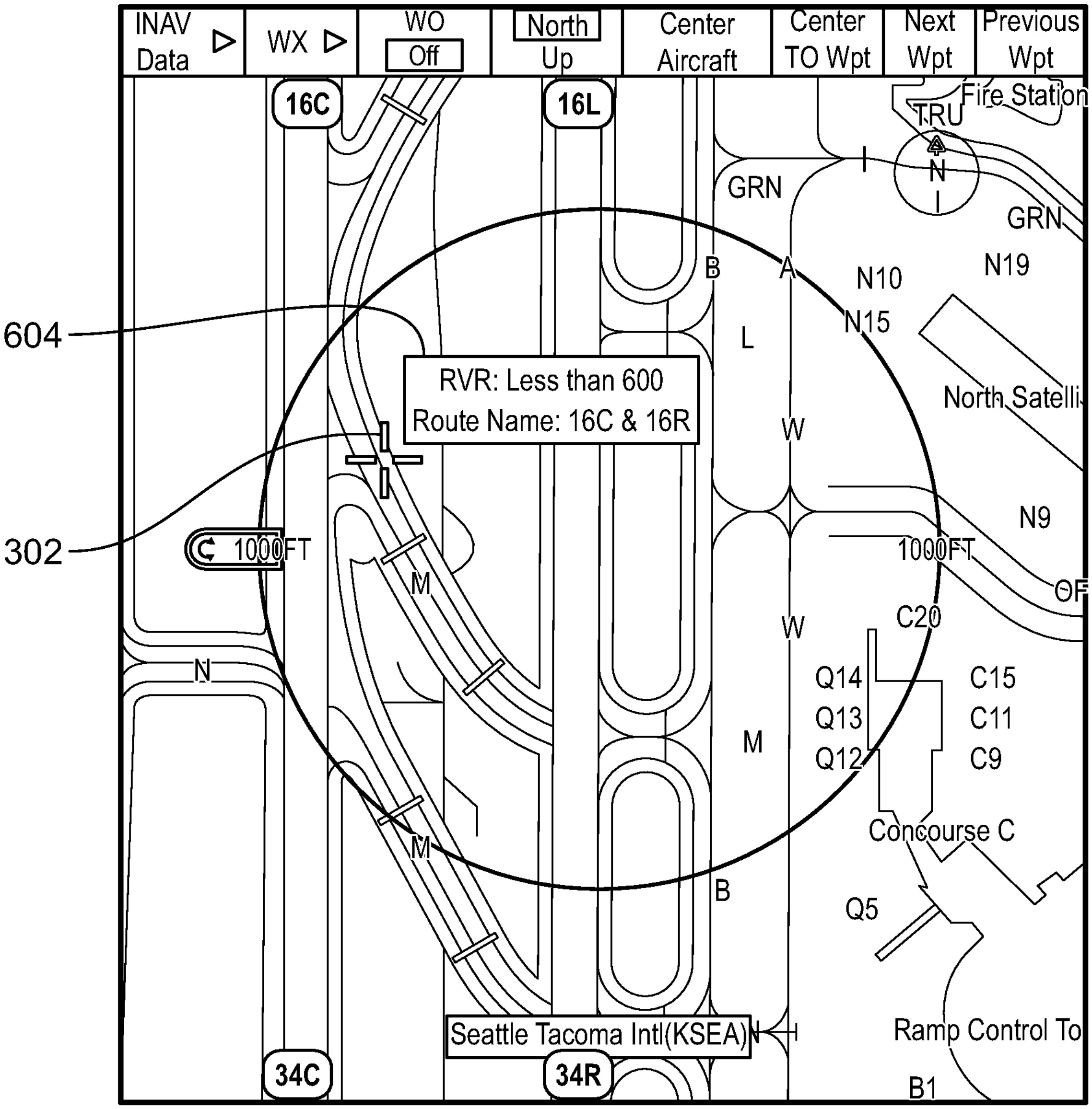

In various embodiments, a user may select a route, as shown in FIG. 6. The LVTR and PTR has been displayed in highlighted boxes, and in response to a pilot selection of one of them, the controller circuit 12 may render the applicable RVR, route name, and associated runway. In FIG. 6, the cursor 602 is shown to have selected the LVTR, and a text box 604 is shown, displaying an alphanumeric message, "RVR: less than 600 [ft], Route name 16C and 16R.

AMM 700 illustrates user input options that various embodiments provide. In the example, the system 10 may prompt a user to request the optimized runway when it is different than the target runway. The user may opt to display all low visibility routes by selecting a graphical user interface (GUI) object 702, or may opt to only display preferred routes, by selecting GUI object 704.

In AMM 800, in response to a user input selecting (at 806) this view, the area of the avionic display 38 is split to render the AMM on a first area 802 and a cross-linked published LVO chart on a second area 804. In various embodiments, the first area and the second area are each half of a total display area of the avionic display 38.

Figure 9:
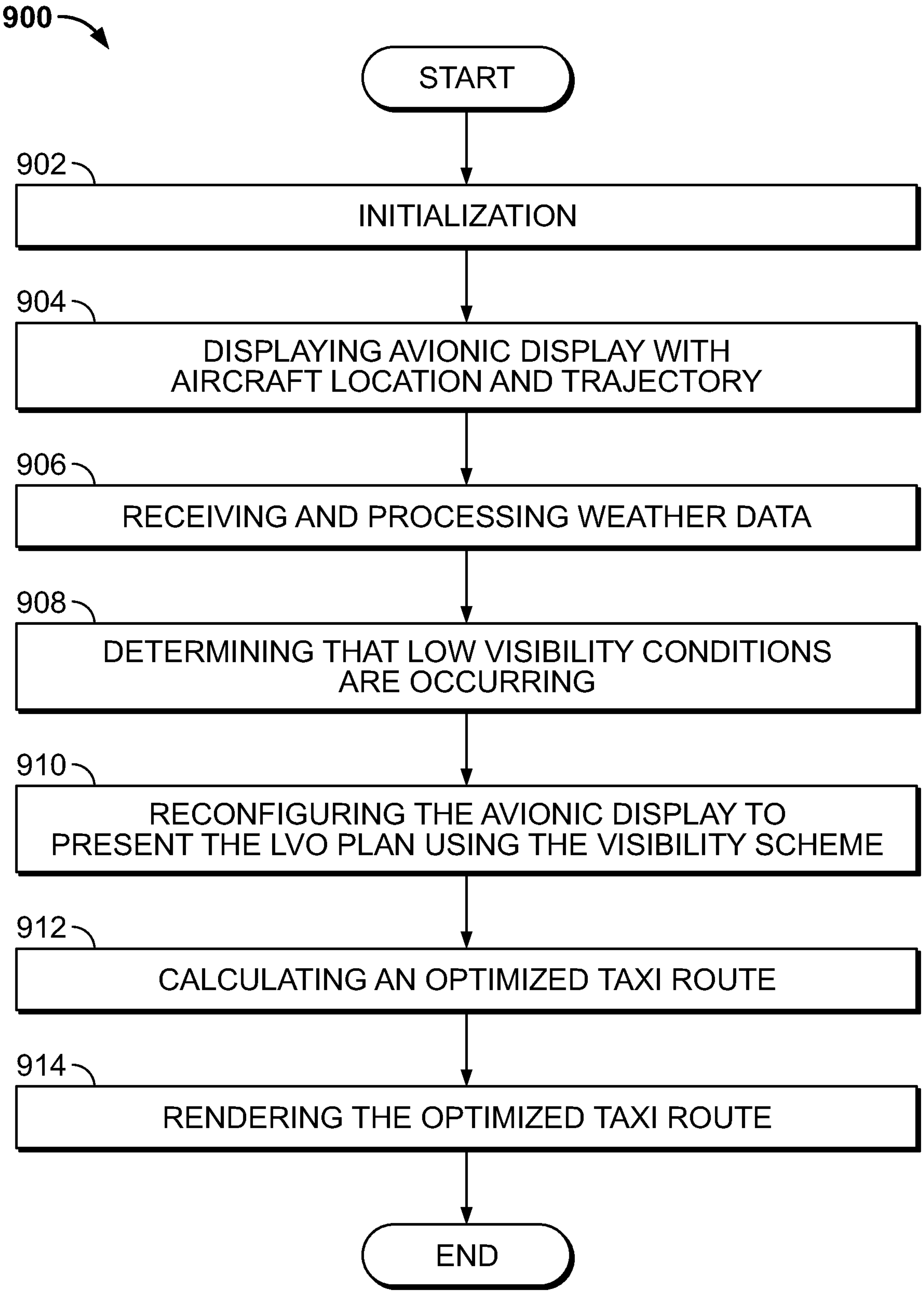
FIG. 9 is a flow chart of a method providing low visibility guidance and taxi routing for an aircraft, as may be implemented by the system of FIG. 1, in accordance with an exemplary embodiment of the present disclosure.

Turning now to FIG. 9, the system 10 described above may be implemented by a processor-executable method 900 providing low visibility guidance and taxi routing for an aircraft. For illustrative purposes, the following description of method 900 may refer to elements mentioned above in connection with FIG. 1. In practice, portions of method 900 may be performed by different components of the described system. It should be appreciated that method 900 may include any number of additional or alternative tasks, the tasks shown in FIG. 9 need not be performed in the illustrated order, and method 900 may be incorporated into a more comprehensive procedure or method having additional functionality not described in detail herein. Moreover, one or more of the tasks shown in FIG. 9 could be omitted from an embodiment of the method 900 as long as the intended overall functionality remains intact.

At 902, the system 10 is initialized. Initialization may include loading instructions and program 34 into a processor 30 within the controller circuit 12, as well as loading at least one visualization scheme 36. At 904, the system 10 is displaying the avionic display 38 showing the aircraft 5 at its current location and with its current trajectory. At 906, weather data is being received and processed. At 908, the relevant weather data is compared to various thresholds and processed by the algorithms in program 34 to determine whether a low visibility condition is occurring at a target airport. At 910, upon the determination that a low visibility condition is occurring, the system 10 reconfigures the avionic display to present the LVO plan using the visibility scheme, as described above. At 912, the system 10 calculates an optimized taxi route. At 914, the system renders the optimized taxi route.

Thus, enhanced aircraft guidance systems and methods providing low visibility guidance and taxi routing for an aircraft are provided. The provided methods and systems provide an objectively improved human-machine interface with map views, clear indications of the LVTR and/or PTR, and cross-referencing to the appropriate LVO plan chart. The provided enhanced features provide a user with increased confidence about the surroundings during low visibility operations in a landing area.

Although an exemplary embodiment of the present disclosure has been described above in the context of a fully-functioning computer system (e.g., system 10 described above in conjunction with FIG. 1), those skilled in the art will recognize that the mechanisms of the present disclosure are capable of being distributed as a program product (e.g., an Internet-disseminated program or software application) and, further, that the present teachings apply to the program product regardless of the particular type of computer-readable media (e.g., hard drive, memory card, optical disc, etc.) employed to carry-out its distribution.

Terms such as "comprise," "include," "have," and variations thereof are utilized herein to denote non-exclusive inclusions. Such terms may thus be utilized in describing processes, articles, apparatuses, and the like that include one or more named steps or elements but may further include additional unnamed steps or elements. While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. Various changes may be made in the function and arrangement of elements described in an exemplary embodiment without departing from the scope of the invention as set-forth in the appended Claims.

What is claimed is:

1. A system for low visibility surface movement guidance for an aircraft navigating an airport environment, comprising:

a source of aircraft status data;

a display device configured to render an avionic display showing a location and trajectory of the aircraft;

a source of a low visibility operation (LVO) plan, the LVO plan providing an available low visibility taxi route (LVTR) options for a taxi operation target at the airport;

a source configured to provide an enable for a low-visibility setting;

a source of a visualization scheme, the visualization scheme being a scheme for rendering low visibility (LV) features in the LVO plan;

a source of weather data; and a controller circuit operationally coupled to the source of aircraft status data, the display device, the source of the LVO plan, the source configured to provide an enable for a low-visibility setting, the source of the visualization scheme, and the source of weather data, the controller circuit configured to:

receive the enable for the low-visibility setting;

determine that low visibility (LV) conditions are occurring, responsive to the enable for the low-visibility setting;

reconfigure the avionic display to present the LVO plan, in accordance with the visualization scheme, responsive to determining that LV conditions are occurring;

calculate an optimized taxi route for the aircraft to a target airport point of interest, as a function of the LVO plan, responsive to determining that LV conditions are occurring; and render the optimized taxi route on the reconfigured avionic display, wherein the target airport point of interest is a target runway, and the controller circuit is further configured to:

predict an optimized runway for the aircraft at the airport, responsive to determining that LV conditions are occurring; and prompt a user to request the optimized runway when it is different than the target runway.

2. The system of claim 1, wherein the avionic display is a primary flight display (PFD) or a navigation display.

3. The system of claim 1, wherein the controller circuit is further configured to determine that low visibility (LV) conditions are occurring by comparing the weather data to a preprogrammed runway visibility threshold.

4. The system of claim 3, wherein the controller circuit is further configured to render the avionic display to have an AMM on a first area and a published LVO chart on a second area, responsive to a user input.

5. The system of claim 1, further comprising a flight management system (FMS), and wherein the controller circuit is further configured to receive the target airport point of interest from the FMS.

6. The system of claim 1, further comprising a user input interface, and wherein the controller circuit is further configured to receive the target airport point of interest from the user input interface.

7. A processor-implemented method for providing low visibility surface movement guidance for an aircraft navigating an airport environment, comprising:

rendering, on a display device, an avionic display showing a location and trajectory of the aircraft, using received aircraft status data;

receiving weather data;

determining that low visibility conditions are occurring;

referencing a plan providing an available low visibility taxi route (LVTR) option for a target runway at the airport, or a preferred taxi route (PTR), responsive to determining that low visibility (LV) conditions are occurring;

reconfiguring the avionic display to present a low visibility operation (LVO) plan or a PTR plan, rendered in accordance with a preprogrammed visualization scheme for rendering LV features, responsive to determining that LV conditions are occurring;

calculating an optimized taxi route for the aircraft to a target airport point of interest, as a function of the LVO plan or PTR plan, responsive to determining that LV conditions are occurring; and rendering the optimized taxi route on the reconfigured avionic display, wherein the target airport point of interest is a target runway, and the method further comprises:

predicting an optimized runway for the aircraft at the airport, responsive to determining that LV conditions are occurring; and prompting a user to request the optimized runway when it is different than the target runway.

8. The method of claim 7, further comprising determining that low visibility (LV) conditions are occurring by comparing the weather data to a preprogrammed runway visibility threshold.

9. The method of claim 8, further comprising rendering the avionic display to have an AMM on a first area and a published LVO chart on a second area, responsive to a user input.

10. The method of claim 8, further comprising receiving the target airport point of interest from a flight management system (FMS).

11. The method of claim 10, further comprising receiving the target airport point of interest from a user input interface.

12. A system for low visibility surface movement guidance for an aircraft navigating an airport environment, comprising:

an avionic display module on an aircraft, configured by programming instructions to receive ownship data and generate an avionic display on a display device; and respond to display commands; and a low visibility (LV) conditions module, configured by programming instructions to:

determine when low visibility LV conditions are occurring;

generate display commands to reconfigure the avionic display to present a low visibility operation (LVO) plan, rendered in accordance with a preprogrammed visualization scheme for rendering LV features in the LVO plan, responsive to determining that LV conditions are occurring;

calculate an optimized taxi route for the aircraft to a target airport point of interest, as a function of the LVO plan, responsive to determining that LV conditions are occurring; and generate display commands to render the optimized taxi route on the reconfigured avionic display, wherein the target airport point of interest is a target runway, and the LV conditions module is further configured to:

predict an optimized runway for the aircraft at the airport, responsive to determining that LV conditions are occurring; and prompt a user to request the optimized runway when it is different than the target runway.

13. The system of claim 12, wherein the LV conditions module is further configured to determine that low visibility (LV) conditions are occurring by comparing the weather data to a preprogrammed runway visibility threshold.

14. The system of claim 13, wherein the LV conditions module is further configured to render the avionic display to have an AMM on a first area and a published LVO chart on a second area, responsive to a user input.

15. The system of claim 13, wherein the LV conditions module is further configured to receive the target airport point of interest from a flight management system (FMS).

16. The system of claim 14, wherein the LV conditions module is further configured to receive the target airport point of interest from a user input interface.

17. The system of claim 15, wherein the LV conditions module is further configured to declutter the avionic display responsive to a request via a user input interface.

* * * * *